United States Patent
Shikata et al.

(10) Patent No.: US 7,399,722 B2
(45) Date of Patent: Jul. 15, 2008

(54) ALUMINA/ZIRCONIA CERAMICS AND METHOD OF PRODUCING THE SAME

(75) Inventors: Kunihide Shikata, Kirishima (JP); Shugo Onitsuka, Kirishima (JP); Wang Yucong, Kirishima (JP)

(73) Assignee: Kyocera Corporation, Kyoto (JP)

( * ) Notice: Subject to any disclaimer, the term of this patent is extended or adjusted under 35 U.S.C. 154(b) by 138 days.

(21) Appl. No.: 11/367,088

(22) Filed: Mar. 2, 2006

(65) Prior Publication Data

US 2006/0178257 A1     Aug. 10, 2006

Related U.S. Application Data

(63) Continuation-in-part of application No. 10/935,910, filed on Sep. 8, 2004, now abandoned.

(30) Foreign Application Priority Data

Sep. 10, 2003    (JP) ............................. 2003-317771

(51) Int. Cl.
     *C04B 35/119*     (2006.01)
(52) U.S. Cl. .................... 501/105; 264/604; 264/663
(58) Field of Classification Search ................ 501/105; 264/604, 663
See application file for complete search history.

(56) References Cited

U.S. PATENT DOCUMENTS

| | | | |
|---|---|---|---|
| 4,316,964 A | 2/1982 | Lange | |
| 4,820,666 A | 4/1989 | Hirano et al. | |
| 5,877,105 A | 3/1999 | Iwai et al. | |
| 7,056,851 B2 * | 6/2006 | Nawa | 501/105 |
| 7,148,167 B2 * | 12/2006 | Shikata et al. | 501/105 |
| 2005/0079971 A1 | 4/2005 | Nawa | |

FOREIGN PATENT DOCUMENTS

| | | |
|---|---|---|
| JP | 61-11665 | 4/1986 |
| JP | 62-202856 | 9/1987 |
| JP | 62-202862 | 9/1987 |
| JP | 1-212273 | 8/1989 |
| JP | 4-31360 | 2/1992 |
| JP | 7-064631 | 12/1995 |

* cited by examiner

*Primary Examiner*—Karl E Group
(74) *Attorney, Agent, or Firm*—Hogan & Hartson LLP

(57) ABSTRACT

Composite ceramics having a high strength, a high toughness and an excellent abrasion resistance, and a method of producing the same. The composite ceramics comprises 10 to 30 mass % of a zirconia crystal phase including Ce-stabilized zirconia crystal particles which contain $CeO_2$ in an amount of 9 to 12 mol % and Y-stabilized zirconia crystal particles which contain $Y_2O_3$ in an amount of 2.8 to 4.5 mol %; and 70 to 90 mass % of an alumina crystal phase, the zirconia crystal phase having an average crystal particle size of not larger than 1 μm.

8 Claims, No Drawings

US 7,399,722 B2

ALUMINA/ZIRCONIA CERAMICS AND METHOD OF PRODUCING THE SAME

CROSS-REFERENCES TO RELATED APPLICATION

This application is a continuation-in-part application from U.S. patent application Ser. No. 10/935,910, now abandoned, which was filed Sep. 8, 2004, claiming a priority based on Japanese Patent Application No. 2003-317771.

BACKGROUND OF THE INVENTION

1. Field of the Invention

The present invention relates to alumina/zirconia ceramics and a method of producing the same. More specifically, the invention relates to alumina/zirconia ceramics having a high strength, a high toughness and a high abrasion resistance suited for use as structural parts, and to a method of producing the same.

2. Background Art

Owing to their excellent mechanical properties and corrosion resistance, ceramics have, in recent years, been used for a variety of structural parts such as various blades, tools, mechanical parts like bearings and members related to living bodies. As ceramics suited for these applications, Japanese Examined Patent Publication (Kokoku) No. 7-64631 discloses zirconia-type composite ceramics containing a zirconia crystal phase stabilized by $CeO_2$ and $Y_2O_3$ and containing an alumina crystal phase, the zirconia crystal phase in the composite ceramics chiefly comprising tetragonal crystals exhibiting excellent mechanical properties such as strength and toughness, and excellent resistance against the hydrothermal aging.

The zirconia-type composite ceramics disclosed in the above Japanese Examined Patent Publication is a zirconia-rich sintered body containing alumina in an amount of 3 to 60% by weight per the stabilized zirconia and having an average crystal particle size of not larger than 3 μm, and features a high flexural strength, a high toughness and a high resistance against the hydrothermal aging, but has a low hardness and a low abrasion resistance.

SUMMARY OF THE INVENTION

It is therefore an object of the present invention to provide composite ceramics featuring not only excellent flexural strength, toughness and resistance against the hydrothermal aging but also a high hardness lending itself well for use as an abrasion resistant material, and a method of producing the same.

According to the present invention, there is provided alumina/zirconia ceramics comprising:

10 to 30 mass % of a zirconia crystal phase including Ce-stabilized zirconia crystal particles which contain $CeO_2$ in an amount of 9 to 12 mol % and Y-stabilized zirconia crystal particles which contain $Y_2O_3$ in an amount of 2.8 to 4.5 mol %; and 70 to 90 mass % of an alumina crystal phase;

the Ce-stabilized zirconia crystal particles and the Y-stabilized zirconia crystal particles having an average crystal particle size of not larger than 1 μm, respectively.

In the alumina/zirconia ceramics of the present invention, it is desired that:

(1) the alumina crystal phase has an average crystal particle size of not larger than 2 μm;

(2) Zn is contained in an amount of not larger than 3 mass % calculated as an oxide thereof per 100 mass % of the total amount of the zirconia crystal phase and the alumina crystal phase, and needle-like crystals of a composite oxide including Ce and Al as constituent elements are further contained;

(3) the composite oxide has a magnetoplumbite structure expressed by the formula $ZnCeAl_{11}O_{19}$; and (4) a Vickers' hardness is not smaller than 1600, a fracture toughness is not smaller than 4.5, and a flexural strength after hydrothermal aging testing is not smaller than 1000 MPa.

According to the present invention, there is further provided a method of producing alumina/zirconia ceramics comprising the steps of:

preparing a Ce-stabilized zirconia powder having an average particle size of not larger than 1 μm and in which $CeO_2$ is dissolved as a solid solution in an amount of 9 to 12 mol %, a Y-stabilized zirconia powder having an average particle size of not larger than 1 μm and in which $Y_2O_3$ is dissolved as a solid solution in an amount of 2.8 to 4.5 mol %, and an alumina powder having an average particle size of not larger than 2 μm;

preparing a mixed powder for molding by mixing the Ce-stabilized zirconia powder, the Y-stabilized zirconia powder and the alumina powder so as to satisfy the following conditions (a) and (b):

(a) the mass ratio of the Ce-stabilized zirconia powder to the Y-stabilized zirconia powder is 65/35 to 85/15; and (b) the mass ratio of the total amount of the Ce-stabilized zirconia powder and the Y-stabilized zirconia power to the alumina powder is 10/90 to 30/70;

molding the mixed powder for molding into a predetermined shape; and firing the obtained molded article in an oxidizing atmosphere of not higher than 1600° C.

In the production method of the invention, it is desired that:

(5) the mixed powder for molding contains a zinc oxide powder in an amount of not larger than 3 parts by mass per 100 parts by mass of the total amount of the Ce-stabilized zirconia powder, Y-stabilized zirconia powder and alumina powder; and (6) after the firing step, a hot isostatic pressure firing is further conducted at not higher than 1500° C.

A composite ceramics of the present invention is an alumina/zirconia ceramics rich in alumina, containing alumina in an amount of as large as 70 to 90 mass %, and has a high hardness and an excellent abrasion resistance. Besides, the zirconia crystal phase is composed of Ce-stabilized zirconia crystal particles stabilized with $CeO_2$ and Y-stabilized zirconia crystal particles stabilized with $Y_2O_3$, in result, the zirconia crystal phase chiefly comprises tetragonal crystals. Further, the growth of zirconia crystal particles is suppressed to be not larger than 1 μm on the average, making it possible to effectively avoid a drop in the strength caused by an increase in the amount of alumina, exhibiting excellent strength and toughness as well as a high hydrothermal resistance, such as a Vickers' hardness of not lower than 1600 and a fracture toughness of not smaller than 4.5 yet maintaining a flexural strength of not lower than 1000 MPa even after the hydrothermal aging testing.

As described above, the alumina/zirconia ceramics of the present invention features a high strength, a high toughness, a high hardness and an excellent abrasion resistance as well as an excellent resistance against the hydrothermal aging, and is very useful for producing a variety of structural parts, various blades and tools, mechanical parts such as bearings, and as members associated with living bodies.

DETAILED DESCRIPTION OF THE INVENTION (Alumina/Zirconia Ceramics)

The alumina/zirconia ceramics of the present invention has a basic structure in that it has a zirconia crystal phase and an alumina crystal phase as crystal phases, and is rich in alumina. Namely, the content of the alumina crystal phase is 70 to 90 mass % and, particularly, 75 to 85 mass %, and the content of the zirconia crystal phase is 30 to 10 mass % and, particularly, 15 to 25 mass %. By employing the alumina-rich composition, it is allowed to realize a high hardness and to improve the abrasion resistance. When the content of the alumina crystal phase is, for example, smaller than 70 mass % (or when the content of the zirconia crystal phase exceeds 30 mass %), a high hardness is not achieved and the Vickers' hardness cannot be increased to be not lower than 1600. Further, when the content of the alumina crystal phase is, for example, more than 90 mass % (or when the content of the zirconia crystal phase is smaller than 10 mass %), the alumina crystals grow greatly and, particularly, toughness drops among the mechanical properties. In the present invention having the alumina-rich composition as described above, the zirconia crystal phase is usually dispersed in the grain boundaries of the alumina crystal phase. The above dispersed structure is advantageous for realizing an increased hardness based on the alumina crystal phase.

In the present invention, further, it is very important that the average crystal particle size of the zirconia crystal phase is smaller than the average particle size of the alumina and is, particularly, not larger than 1 μm and, preferably, in a range of 0.3 to 0.7 μm. Namely, the present invention has a structure effectively suppressing the growth of zirconia crystal particles and, hence, a high strength and a high toughness are realized due to fine granulation or high density. It is further desired that the growth of alumina crystal particles is suppressed from the standpoint of increasing the strength and the toughness. For instance, it is desired that the alumina crystal phase has an average crystal particle size of not larger than 2 μm and, particularly, in a range of 0.8 to 1.3 μm.

In the present invention, further, it is important that the zirconia crystal phase is composed of Ce-stabilized zirconia crystal particles which contain $CeO_2$ in an amount of 9 to 12 mol % and, particularly, 10 to 11 mol %, and Y-stabilized zirconia crystal particles which contain $Y_2O_3$ in an amount of 2.8 to 4.5 mol % and, particularly, 2.9 to 3.3 mol %. Namely, the alumina/zirconia ceramics of the present invention is constituted by zirconia crystal particles stabilized with $CeO_2$ dissolved as a solid solution and zirconia crystal particles stabilized with $Y_2O_3$ dissolved as a solid solution. Since $CeO_2$ and $Y_2O_3$ are existing in the above-mentioned amounts, the zirconia crystal phase is stabilized as tetragonal crystals suppressing the precipitation of monoclinic crystals and cubic crystals. As a result, the strength (e.g., flexural strength) and toughness are enhanced, and the hardness is enhanced, too.

When, for example, the Ce-stabilized zirconia crystal particles contain $CeO_2$ in smaller amount than the above range or the Y-stabilized zirconia crystal particles contain $Y_2O_3$ in smaller amount than the above range, monoclinic crystals forming a metastable phase tend to be precipitated. Further, when the Ce-stabilized zirconia crystal particles contain $CeO_2$ in greater amount than the above range or the Y-stabilized zirconia crystal particles contain $Y_2O_3$ in greater amount than the above range, the cubic crystals increase. In either case, the result is a decrease in the flexural strength, toughness and hardness.

Here, $Y_2O_3$ is a trivalent oxide. When it is dissolved in $ZrO_2$ which is a tetra-valent oxide, oxygen voids are formed. As water acts upon the oxygen voids, the zirconia bond is cut to induce hydrothermal aging. That is, when it is attempted to improve the properties such as the strength by using $Y_2O_3$ only as a stabilizer for the zirconia crystal phase, the resistance against the hydrothermal aging decreases drastically. However, the alumina/zirconia ceramics of the present invention contains the Ce-stabilized zirconia crystal particles stabilized by $CeO_2$, together with the Y-stabilized zirconia crystal particles stabilized by $Y_2O_3$, making it possible to improve various properties while suppressing the amount of $Y_2O_3$ to a degree that will not impair the resistance against the hydrothermal aging. Namely, $CeO_2$ is a tetra-valent oxide which does not form oxygen voids even when it is dissolved in $ZrO_2$ as a solid solution, and no hydrothermal aging is induced. According to the present invention as will be understood from the above, it is necessary that $CeO_2$ is maintained in its tetravalent state; i.e., it is necessary to prevent the formation of $Ce_2O_3$ from $CeO_2$ in the step of firing. This means will be described later.

It is desired that the alumina/zirconia ceramics of the invention contains Zn in an amount of not larger than 3 mass % and, particularly, in an amount of not smaller than 0.3 mass % calculated as an oxide per 100 mass % of the total amount of the zirconia crystal phase and the alumina crystal phase. Namely, Zn stems from the zinc oxide (ZnO) added to the ceramic starting material powder. By conducting the firing in the presence of ZnO, there precipitate needle-like crystals of the composite oxide which contains Ce and Al as constituent elements to further improve the toughness. Here, however, part of the composite oxide has a magnetoplumbite structure as expressed by the formula $ZnCeAl_{11}O_{19}$ and has a hardness lower than that of alumina. When the composite oxide precipitates in large amounts, therefore, the hardness drops and, besides, large needle-like crystals precipitate causing the strength to decrease. It is, therefore, desired that the amount of Zn existing in this system lies within the above range (not larger than 3 mass % and, particularly, not smaller than 0.3 mass %) to exhibit the effect of improving the toughness while permitting needle-like crystals of suitable sizes to be precipitated in suitable amounts without decreasing the hardness or the strength.

In addition to the above components, the alumina/zirconia ceramics of the invention may further contain firing assistants, for example, oxide components stemming from the firing assistants such as SrO, BaO and CaO. These oxide components, usually, exist on the grain boundaries of crystals, and may partly dissolve in the crystal phases as solid solutions.

The above-mentioned alumina/zirconia ceramics of the invention exhibits excellent strength such as a flexural strength and a toughness, as well as a high hardness, an excellent abrasion resistance and a good resistance against the hydrothermal aging. As will become clear from Examples appearing later, for example, the alumina/zirconia ceramics of the invention exhibits a Vickers' hardness of not lower than 1600, a fracture toughness of not smaller than 4.5 and a flexural strength after hydrothermal aging testing of not smaller than 1000 MPa. The composite ceramics of the invention having the above properties is very useful for such applications as various structural parts such as blades and tools of various kinds, mechanical parts such as bearings, and members associated with the living bodies.

(Production of Alumina/Zirconia Ceramics)

The alumina/zirconia ceramics of the invention is produced by preparing various starting material powders that serve as a source of zirconia crystals and a source of alumina crystals so as to satisfy the above-mentioned composition, mixing the starting material powders in amounts of a predetermined ratio to prepare a mixed powder for molding, followed by molding and firing.

<Starting Material Powders>

As the starting material powders that serve as a source of zirconia crystals, there are used a Ce-stabilized zirconia powder in which a predetermined amount (9 to 12 mol %, particularly, 10 to 11 mol %) of $CeO_2$ is dissolved as a solid solution and a Y-stabilized zirconia powder in which a predetermined amount (2.8 to 4.5 mol %, particularly, 2.9 to 3.3 mol %) of $Y_2O_3$ is dissolved as a solid solution. When the $CeO_2$ content or the $Y_2O_3$ content is outside the above range, high strength or high toughness due to the stabilized tetragonal crystal cannot be achieved. These stabilized zirconia powders are obtained by mixing a predetermined amount of $CeO_2$ or $Y_2O_3$ and the zirconia powder, and calcining the mixture at a temperature of about 700 to about 1100° C. It is further allowable to prepare a stabilized zirconia powder by mixing metal salts or alkoxides of Ce, Y, and zirconium in an aqueous solution of which the pH has been adjusted followed by hydrolysis (hydrolysis method) or by a so-called thermal decomposition method.

As the stabilized zirconia powder, there should be used a fine powder having an average particle size of not larger than 1 μm and, preferably, not larger than 0.7 μm. This is because use of the powder having a large average particle size causes the average particle diameter of the zirconia crystals to become great and, hence, results in a decrease in the hardness. The stabilized zirconia powders contain hafnia ($HfO_2$) and the like as unavoidable impurities. It is, however, desired that the purity of the stabilized zirconia powders is not smaller than 99.9 mass %.

An alumina powder is used as a source of alumina crystals. Here, it is desired that the alumina powder has an average particle size of not larger than 2 μm and, particularly, not larger than 1.5 μm. Use of a coarse powder having a large average particle size causes the alumina crystal phase to possess an increased average particle size resulting in a decrease in the strength. It is further desired that the alumina powder, too, has a purity of not lower than 99.9 mass %.

It is further desired to use a zinc oxide (ZnO) powder in addition to the above stabilized zirconia powders and the alumina powder. As described earlier, the zinc oxide powder is for precipitating needle-like crystals of the composite oxide for improving the toughness. In order for the fine needle-like crystals to be precipitated in a state of being homogeneously dispersed, it is desired that the zinc oxide powder has an average particle size of not larger than 1 μm and, particularly, not larger than 0.5 μm.

Further, in order to enhance the sintering property, there is used, as required, a powder of SrO, BaO or CaO as a sintering assistant. These sintering assistants are not limited to the oxides but may be in the form of a compound that forms an oxide upon the firing, such as a carbonate. It is desired that the sintering assistants have an average particle size of, generally, not larger than 1 μm.

<Preparation of the Molding Powder>

In the present invention, the above-mentioned various starting material powders are mixed together to prepare a mixed powder for molding. It is necessary that the mixed powder satisfies the following conditions.

First, the mass ratio of the Ce-stabilized zirconia powder to the Y-stabilized zirconia powder must be in a range of 65/35 to 85/15 and, particularly, 70/30 to 80/20 (condition (a)). Namely, as described earlier, the Y-stabilized zirconia has poor resistance against the hydrothermal aging. In order to maintain a good resistance against the hydrothermal aging while improving the strength and toughness by being stabilized by the tetragonal crystals, therefore, it is necessary to use the Ce-stabilized zirconia powder and the Y-stabilized zirconia powder in amounts maintaining the above ratio.

It is further important that the mass ratio of the total amount of the Ce-stabilized zirconia powder and the Y-stabilized zirconia powder to the alumina powder is in a range of 10/90 to 30/70 and, particularly, 15/85 to 25/75 (condition (b)). By mixing the stabilized zirconia powder and the alumina powder in amounts maintaining the above ratio, it is allowed to realize the above-mentioned alumina-rich composition, an increased strength and an improved abrasion resistance.

To precipitate needle-like crystals of the composite oxide by using the above-mentioned zinc oxide powder, further, it is necessary to use the zinc oxide powder in an amount of not larger than 3 parts by mass and, particularly, not smaller than 0.3 parts by mass per 100 parts by mass of the total amount of the stabilized zirconia powders (Ce-stabilized zirconia powder and Y-stabilized zirconia powder) and the alumina powder. As described already, when the zinc oxide powder is used in large amounts, needle-like crystals of the composite oxide precipitate in large amounts resulting in a decrease in the hardness and, besides, the needle-like crystals become large in size causing a decrease in the strength.

Further, when a powder of sintering assistant is to be used, its amount is usually not larger than 3 parts by mass and, particularly, not larger than 2 parts by mass per 100 parts by mass of the total amount of the stabilized zirconia powders (Ce-stabilized zirconia powder and Y-stabilized zirconia powder) and the alumina powder.

<Molding>

To mold the above mixed powder for molding, there is, as required, prepared a slurry or a paste thereof (or a powder obtained by drying a slurry or a paste) by using a solvent of water or an organic solvent. The slurry, the paste or the powder is molded. As the molding means, there can be employed any known means such as press-molding, casting, cold isostatic pressure molding or cold isostatic pressure treatment.

<Firing>

The molded article obtained above must be fired in an oxidizing atmosphere such as open atmosphere at not higher than 1600° C. When the firing is effected at a temperature in excess of 1600° C., the zirconia crystal phase and the alumina crystal phase grow causing a decrease in the flexural strength and in the hardness. When the firing is effected at a too low temperature, it becomes difficult to obtain a densely sintered body. Usually, therefore, it is desired to conduct the firing at not lower than 1400° C. The above firing is usually effected until the relative density of the sintered body becomes not smaller than 95% and, particularly, not smaller than 98% as measured by the Archimedes' method, say, for about 1 to about 5 hours.

In the Ce-stabilized zirconia in which $CeO_2$ is dissolved as a solid solution used in the invention, $CeO_2$ tends to be easily reduced into $Ce_2O_3$ at high temperatures, and $Ce_2O_3$ does not dissolve in $ZrO_2$ as a solid solution. Therefore, formation of $Ce_2O_3$ brings about a decrease in the hardness and in the strength of the sintered body. To prevent the formation of $Ce_2O_3$, therefore, it is necessary to conduct the firing in an oxidizing atmosphere such as in the open air.

After the above firing, further, it is desired in the invention to conduct the hot isostatic pressure firing in an oxidizing atmosphere such as in the open air at a temperature of not higher than 1400° C., particularly, at a temperature of 1200 to 1350° C. for about 1 to about 2 hours. This makes it possible to realize a high density suppressing the growth of the zirconia crystal phase and the alumina crystal phase that constitute the composite ceramics, and to increase the relative density of the sintered body to be, for example, not smaller than 99%. In conducting the hot isostatic pressure firing, further, it is desired that the oxygen concentration in the atmosphere is not lower than 15% and, particularly, not lower than 18%, so that $Ce_2O_3$ that happens to be formed is oxidized again into $CeO_2$ so as to dissolve as a solid solution in the zirconia crystal phase.

After the above hot isostatic pressure firing, further, the heat treatment can be conducted at a temperature of 1100 to 1400° C. in an oxidizing atmosphere such as in the open air. Namely, the heat treatment under an oxygen partial pressure promotes the dissolution of the sintering assistant components in the crystal phases to increase the hardness and the abrasion resistance. The above heat treatment is usually conducted for about 1 to about 10 hours.

There is thus obtained the alumina/zirconia ceramics of the present invention having the above-mentioned composition and properties.

EXAMPLES (Experiment 1)

Ce-stabilized zirconia powders (called first zirconia powders) in which $CeO_2$ was dissolved as a solid solution in the amount shown in Table 1, and Y-stabilized zirconia powders (called second zirconia powders) in which $Y_2O_3$ was dissolved as a solid solution in the amount shown in Table 1, were prepared by a hydrolysis method. The first zirconia powders and the second zirconia powders all possessed a purity of 99.9 mass % and an average particle size of 0.2 μm.

The first zirconia powders and the second zirconia powders were mixed at ratios shown in Table 1 to prepare zirconia starting material powders which were then mixed with an alumina powder (average particle size of 0.3 μm, purity of 99.9 mass %) at ratios shown in Table 1 to prepare mixed powders for molding. The zirconia starting material powders and the alumina powder were mixed together by using highly pure abrasion resistant alumina balls and a polyethylene container and by conducting the wet ball mill mixing using isopropanol (IPA) as a solvent (mixing time of 100 hours). Then, the mixed powders obtained by drying were press-molded, and were fired in the open air at 1400 to 1650° C. for 2 hours to prepare rod-like sintered bodies (samples Nos. 1 to 18).

Next, some sintered bodies (having relative densities of not smaller than 95%) were subjected to the hot isostatic pressure firing (HIP) for 1 hours under the conditions (atmospheres and temperatures) shown in Table 1 to obtain densely sintered bodies having relative densities of not lower than 99.5% (samples Nos. 19 to 25). Further, some densely sintered bodies were heat-treated in the open air at a temperature of 1250° C. for 1 hours (samples Nos. 22 to 24).

The sintered bodies obtained above were ground to prepare samples measuring 4×3×35 mm, were observed for their crystalline structures by using an electron microscope, and were evaluated for their properties to obtain results as shown in Table 1.

In observing the crystalline structures by using an electron microscope, average crystal diameters of the zirconia crystal phase and of the alumina crystal phase were found concerning those existing along the diagonal lines of the electron microphotographs. Measuring portions were 10 points each.

Properties were evaluated by measuring flexural strengths at room temperature and measuring the flexural strengths after the hydrothermal aging test (after treated at 120° C., 100% RH for 300 hours) in compliance with JIS-R1601, by measuring fracture toughness by the SEPB method in compliance with JIS-R1607, and by measuring the Vickers' hardness in compliance with JIS-R1610.

TABLE 1

| Sample No. | 1st zirconia powder $CeO_2$ (mol %) | 2nd zirconia powder $Y_2O_3$ (mol %) | 1st zirconia powder ($CeO_2$)/ 2nd zirconia powder ($Y_2O_3$) (mass %) | Amount of zircona powder (mass %) | Amount of alumina powder (mass %) | Firing temperature (° C.) | HIP (° C.) | Heat temperature (° C.) | Average particle size Zirconia crystal phase (μm) | Average particle size Alumina phase (μm) | Fracture toughness (GPa) | Vickers' hardness | Flexural strength (MPa) | Flexural strength after hydrothermal aging (MPa) |
|---|---|---|---|---|---|---|---|---|---|---|---|---|---|---|
| *1 | 7 | 1.5 | 70/30 | 20 | 80 | 1500 | — | — | 0.3 | 0.8 | 4.2 | 1664 | 1384 | 833 |
| 2 | 9 | 4.5 | 70/30 | 20 | 80 | 1500 | — | — | 0.4 | 0.9 | 4.5 | 1768 | 1251 | 1181.5 |
| 3 | 10 | 2.9 | 70/30 | 20 | 80 | 1500 | — | — | 0.4 | 1.0 | 5.2 | 1729 | 1242 | 1173 |
| 4 | 11 | 3.3 | 70/30 | 20 | 80 | 1500 | — | — | 0.4 | 1.0 | 5.3 | 1716 | 1188 | 1122 |
| 5 | 12 | 2.8 | 70/30 | 20 | 80 | 1500 | — | — | 0.5 | 1.2 | 5.4 | 1664 | 1125 | 1062.5 |
| *6 | 14 | 5 | 70/30 | 20 | 80 | 1500 | — | — | 0.7 | 1.6 | 4.2 | 1612 | 702 | 663 |
| *7 | 10 | 2.9 | 50/50 | 20 | 80 | 1500 | — | — | 0.3 | 0.8 | 4.0 | 1885 | 1566 | 1479 |
| 8 | 10 | 2.9 | 65/35 | 20 | 80 | 1500 | — | — | 0.3 | 0.8 | 4.7 | 1759 | 1285 | 1402.5 |
| 9 | 10 | 2.9 | 80/20 | 20 | 80 | 1500 | — | — | 0.4 | 1.0 | 5.6 | 1729 | 1152 | 1088 |
| 10 | 10 | 2.9 | 85/15 | 20 | 80 | 1500 | — | — | 0.5 | 1.0 | 5.7 | 1625 | 1084 | 1035 |
| *11 | 10 | 2.9 | 100/0 | 20 | 80 | 1500 | — | — | 0.6 | 1.0 | 6.0 | 1550 | 765 | 722.5 |
| *12 | 10 | 2.9 | 70/30 | 5 | 95 | 1500 | — | — | 0.3 | 1.4 | 3.9 | 1870 | 1179 | 1113.5 |
| 13 | 10 | 2.9 | 70/30 | 10 | 90 | 1500 | — | — | 0.4 | 1.3 | 4.6 | 1820 | 1188 | 1122 |
| 14 | 10 | 2.9 | 70/30 | 30 | 70 | 1500 | — | — | 0.5 | 1.1 | 5.3 | 1630 | 1062 | 1003 |
| *15 | 10 | 2.9 | 70/30 | 40 | 60 | 1500 | — | — | 0.6 | 1.0 | 5.6 | 1510 | 738 | 697 |
| 16 | 10 | 2.9 | 70/30 | 20 | 80 | 1450 | — | — | 0.4 | 0.8 | 5.1 | 1760 | 1242 | 1173 |
| 17 | 10 | 2.9 | 70/30 | 20 | 80 | 1600 | — | — | 0.7 | 1.9 | 5.8 | 1615 | 1090 | 1010 |

TABLE 1-continued

| Sample No. | 1st zirconia powder CeO₂ (mol %) | 2nd zirconia powder Y₂O₃ (mol %) | 1st zirconia powder (CeO₂)/ 2nd zirconia powder (Y₂O₃) (mass %) | Amount of zircona powder (mass %) | Amount of alumina powder (mass %) | Firing temperature (° C.) | HIP (° C.) | Heat temperature (° C.) | Average particle size Zirconia crystal phase (μm) | Average particle size Alumina phase (μm) | Fracture toughness (GPa) | Vickers' hardness | Flexural strength (MPa) | Flexural strength after hydrothermal aging (MPa) |
|---|---|---|---|---|---|---|---|---|---|---|---|---|---|---|
| *18 | 10 | 2.9 | 70/30 | 20 | 80 | 1650 | — | — | 1.2 | 3.5 | 6.5 | 1520 | 850 | 780 |
| 19 | 10 | 2.9 | 70/30 | 10 | 90 | 1500 | (O2) 1400 | — | 0.4 | 1.3 | 5.1 | 1850 | 1320 | 1260 |
| 20 | 10 | 2.9 | 70/30 | 20 | 80 | 1500 | (O2) 1400 | — | 0.5 | 1.2 | 5.6 | 1780 | 1370 | 1320 |
| 21 | 10 | 2.9 | 70/30 | 30 | 70 | 1500 | (O2) 1400 | — | 0.5 | 1.1 | 6.1 | 1680 | 1430 | 1390 |
| 22 | 10 | 2.9 | 70/30 | 10 | 90 | 1500 | (Ar) 1400 | 1250 | 0.4 | 1.3 | 5.0 | 1830 | 1290 | 1210 |
| 23 | 10 | 2.9 | 70/30 | 20 | 80 | 1500 | (Ar) 1400 | 1250 | 0.5 | 1.2 | 5.4 | 1750 | 1350 | 1290 |
| 24 | 10 | 2.9 | 70/30 | 30 | 70 | 1500 | (Ar) 1400 | 1250 | 0.5 | 1.1 | 5.8 | 1660 | 1390 | 1350 |
| 25 | 10 | 2.9 | 70/30 | 30 | 70 | 1500 | (Ar) 1400 | — | 0.5 | 1.1 | 5.5 | 1630 | 1290 | 1180 |

Samples marked with * lie outside the scope of the invention.

As will be obvious from the results of Table 1, the samples Nos. 2 to 5, 8 to 10, 13, 14, 16, 17 and 19 to 25 that were the composite ceramics of the present invention all exhibited fracture toughness values of not smaller than 4.5 GPa, Vickers' hardness of not lower than 1625, flexural strengths of not smaller than 1062 MPa, and flexural strengths after the hydrothermal aging testing of not smaller than 1003 MPa. On the other hand, the samples lying outside the scope of the present invention exhibited fracture toughness, Vickers' hardness, flexural strength and flexural strength after the hydrothermal aging testing, at least one of which being poor.

(Experiment 2)

Sintered products were prepared and evaluated in the same manner as in the above Experiment 1 with the exception of further adding a zinc oxide powder (average particle size of 0.3 μm and a purity of 99 mass %) at ratios (mass % per the total amount of the alumina powder and the zirconia powders) shown in Table 2 calculated as an oxide (ZnO) in addition to adding the starting material powders used in Experiment 1. The results were as shown in Table 2.

TABLE 2

| Sample No. | 1st zirconia powder CeO₂ (mol %) | 2nd zirconia powder Y₂O₃ (mol %) | 1st zirconia powder (CeO₂)/ 2nd zirconia powder (Y₂O₃) (mass %) | Amount of zircona powder (mass %) | Amount of alumina powder (mass %) | Amount of zinc oxide powder (mass %) | Firing temperature (° C.) | HIP (° C.) | Zirconia crystal phase (μm) | Alumina phase (μm) | Fracture toughness (GPa) | Vickers' hardness | Flexural strength (MPa) | Flexural strength after hydrothermal aging (MPa) |
|---|---|---|---|---|---|---|---|---|---|---|---|---|---|---|
| *1 | 7 | 1.5 | 70/30 | 20 | 80 | 0.3 | 1500 | — | 0.3 | 0.9 | 4.4 | 1655 | 1375 | 841 |
| 2 | 9 | 4.5 | 70/30 | 20 | 80 | 0.3 | 1500 | — | 0.4 | 1.0 | 4.7 | 1768 | 1239 | 1192 |
| 3 | 10 | 2.9 | 70/30 | 20 | 80 | 0.3 | 1500 | — | 0.4 | 1.1 | 5.4 | 1720 | 1235 | 1179 |
| 4 | 11 | 3.3 | 70/30 | 20 | 80 | 0.3 | 1500 | — | 0.8 | 1.1 | 5.5 | 1705 | 1176 | 1131 |
| 5 | 12 | 2.8 | 70/30 | 20 | 80 | 0.3 | 1500 | — | 0.6 | 1.3 | 5.6 | 1656 | 1125 | 1071 |
| *6 | 14 | 5 | 70/30 | 20 | 80 | 0.3 | 1500 | — | 0.8 | 1.7 | 4.4 | 1601 | 712 | 685 |
| 7 | 10 | 2.9 | 70/30 | 20 | 80 | 0.1 | 1500 | — | 0.4 | 1.0 | 5.2 | 1725 | 1230 | 1160 |
| 8 | 10 | 2.9 | 70/30 | 20 | 80 | 0.5 | 1500 | — | 0.4 | 1.0 | 5.4 | 1720 | 1218 | 1175 |
| 9 | 10 | 2.9 | 70/30 | 20 | 80 | 1 | 1500 | — | 0.5 | 1.1 | 5.7 | 1710 | 1210 | 1180 |
| 10 | 10 | 2.9 | 70/30 | 20 | 80 | 2 | 1500 | — | 0.5 | 1.1 | 6.2 | 1680 | 1180 | 1170 |
| 11 | 10 | 2.9 | 70/30 | 20 | 80 | 3 | 1500 | — | 0.5 | 1.2 | 6.1 | 1650 | 1080 | 1150 |
| *12 | 10 | 2.9 | 70/30 | 20 | 80 | 4 | 1500 | — | 0.6 | 1.3 | 5.6 | 1580 | 970 | 950 |
| *13 | 10 | 2.9 | 50/50 | 20 | 80 | 1 | 1480 | — | 0.3 | 0.8 | 4.4 | 1843 | 1519 | 1467 |
| 14 | 10 | 2.9 | 65/35 | 20 | 80 | 1 | 1480 | — | 0.3 | 0.8 | 5.1 | 1724 | 1248 | 1360 |
| *15 | 10 | 2.9 | 80/20 | 20 | 80 | 1 | 1480 | — | 0.4 | 1.0 | 6.0 | 1703 | 1123 | 1049 |
| 16 | 10 | 2.9 | 85/15 | 20 | 80 | 1 | 1480 | — | 0.5 | 1.0 | 6.1 | 1597 | 1042 | 1022 |
| *17 | 10 | 2.9 | 100/0 | 20 | 80 | 1 | 1480 | — | 0.6 | 1.0 | 6.4 | 1521 | 776 | 736 |
| *18 | 10 | 2.9 | 70/30 | 5 | 95 | 1 | 1480 | — | 0.3 | 1.4 | 4.3 | 1848 | 1151 | 1095 |
| 19 | 10 | 2.9 | 70/30 | 10 | 90 | 1 | 1480 | — | 0.4 | 1.3 | 5.0 | 1795 | 1175 | 1107 |
| 20 | 10 | 2.9 | 70/30 | 30 | 70 | 1 | 1480 | — | 0.5 | 1.1 | 5.7 | 1610 | 1046 | 1022 |
| *21 | 10 | 2.9 | 70/30 | 40 | 60 | 1 | 1480 | — | 0.6 | 1.0 | 6.0 | 1503 | 795 | 762 |
| 22 | 10 | 2.9 | 70/30 | 20 | 80 | 1 | 1450 | — | 0.4 | 0.9 | 5.5 | 1735 | 1242 | 1173 |
| 23 | 10 | 2.9 | 70/30 | 20 | 80 | 1 | 1600 | — | 0.8 | 1.9 | 6.2 | 1607 | 1090 | 1010 |
| *24 | 10 | 2.9 | 70/30 | 20 | 80 | 1 | 1650 | — | 1.3 | 3.6 | 6.7 | 1505 | 831 | 792 |

TABLE 2-continued

| Sample No. | 1st zirconia powder CeO$_2$ (mol %) | 2nd zirconia powder Y$_2$O$_3$ (mol %) | 1st zirconia powder (CeO$_2$)/ 2nd zirconia powder (Y$_2$O$_3$) (mass %) | Amount of zircona powder (mass %) | Amount of alumina powder (mass %) | Amount of zinc oxide powder (mass %) | Firing temperature (° C.) | HIP (° C.) | Average particle size Zirconia crystal phase (μm) | Average particle size Alumina phase (μm) | Fracture toughness (GPa) | Vickers' hardness | Flexural strength (MPa) | Flexural strength after hydrothermal aging (MPa) |
|---|---|---|---|---|---|---|---|---|---|---|---|---|---|---|
| 25 | 10 | 2.9 | 70/30 | 10 | 90 | 1 | 1480 | (O2) 1400 | 0.4 | 1.3 | 5.5 | 1827 | 1312 | 1261 |
| 26 | 10 | 2.9 | 70/30 | 20 | 80 | 1 | 1480 | (O2) 1400 | 0.5 | 1.2 | 6.0 | 1761 | 1365 | 1331 |
| 27 | 10 | 2.9 | 70/30 | 30 | 70 | 1 | 1480 | (O2) 1400 | 0.5 | 1.1 | 6.5 | 1665 | 1408 | 1377 |

Samples marked with * lie outside the scope of the invention.

As will be obvious from the results of Table 2, the samples Nos. 2 to 5, 7 to 11, 14 to 16, 19, 20, 22, 23, and 25 to 27 that were the composite ceramics of the present invention all exhibited fracture toughness values of not smaller than 4.5 GPa, Vickers' hardness of not lower than 1625, flexural strengths of not smaller than 1062 MPa, and flexural strengths after the hydrothermal aging testing of not smaller than 1000 MPa. On the other hand, the samples lying outside the scope of the present invention exhibited fracture toughness, Vickers' hardness, flexural strength and flexural strength after the hydrothermal aging testing, at least one of which being poor.

The invention claimed is:

1. Alumina/zirconia ceramics comprising:
   10 to 30 mass % of a zirconia crystal phase including Ce-stabilized zirconia crystal particles which contain CeO$_2$ in an amount of 9 to 12 mol % and Y-stabilized zirconia crystal particles which contain Y$_2$O$_3$ in an amount of 2.8 to 4.5 mol %; and
   70 to 90 mass % of an alumina crystal phase; the Ce-stabilized zirconia crystal particles and the Y-stabilized zirconia crystal particles having an average crystal particle size of not larger than 1 μm, respectively.

2. Alumina/zirconia ceramics according to claim 1, wherein the alumina crystal phase has an average crystal particle size of not larger than 2 μm.

3. Alumina/zirconia ceramics according to claim 1, wherein Zn is contained in an amount of not larger than 3 mass % calculated as an oxide thereof per 100 mass % of the total amount of the zirconia crystal phase and the alumina crystal phase, and needle-like crystals of a composite oxide including Ce and Al as constituent elements are further contained.

4. Alumina/zirconia ceramics according to claim 3, wherein the composite oxide has a magnetoplumbite structure expressed by the formula ZnCeAl$_{11}$O$_{19}$.

5. Alumina/zirconia ceramics according to claim 1, wherein a Vickers' hardness is not smaller than 1600, a fracture toughness is not smaller than 4.5, and a flexural strength after hydrothermal aging testing is not smaller than 1000 MPa.

6. A method of producing alumina/zirconia ceramics comprising:
   a zirconia crystal phase including Ce-stabilized zirconia crystal particles and Y-stabilized zirconia crystal particles; and an alumina crystal phase;
   comprising the steps of:
   preparing a Ce-stabilized zirconia powder having an average particle size of not larger than 1 μm and in which CeO$_2$ is dissolved as a solid solution in an amount of 9 to 12 mol %, a Y-stabilized zirconia powder having an average particle size of not larger than 1 μm and in which Y$_2$O$_3$ is dissolved as a solid solution in an amount of 2.8 to 4.5 mol %, and an alumina powder having an average particle size of not larger than 2 μm;
   preparing a mixed powder for molding by mixing the Ce-stabilized zirconia powder, the Y-stabilized zirconia powder and the alumina powder so as to satisfy the following conditions (a) and (b):
   (a) the mass ratio of the Ce-stabilized zirconia powder to the Y-stabilized zirconia powder is 65/35 to 85/15; and
   (b) the mass ratio of the total amount of the Ce-stabilized zirconia powder and the Y-stabilized zirconia power to the alumina powder is 10/90 to 30/70;
   molding the mixed powder for molding into a predetermined shape; and
   firing the obtained molded article in an oxidizing atmosphere of not higher than 1600° C.

7. A method of producing alumina/zirconia ceramics comprising the steps of:
   preparing a Ce-stabilized zirconia powder having an average particle size of not larger than 1 μm and in which CeO$_2$ is dissolved as a solid solution in an amount of 9 to 12 mol %, a Y-stabilized zirconia powder having an average particle size of not larger than 1 μm and in which Y$_2$O$_3$ is dissolved as a solid solution in an amount of 2.8 to 4.5 mol %, and an alumina powder having an average particle size of not larger than 2 μm;
   preparing a mixed powder for molding by mixing the Ce-stabilized zirconia powder, the Y-stabilized zirconia powder and the alumina powder so as to satisfy the following conditions (a) and (b):
   (a) the mass ratio of the Ce-stabilized zirconia powder to the Y-stabilized zirconia powder is 65/35 to 85/15; and
   (b) the mass ratio of the total amount of the Ce-stabilized zirconia powder and the Y-stabilized zirconia power to the alumina powder is 10/90 to 30/70;
   molding the mixed powder for molding into a predetermined shape; and
   firing the obtained molded article in an oxidizing atmosphere of not higher than 1600° C., wherein the mixed powder for molding contains a zinc oxide powder in an amount of not larger than 3 parts by mass per 100 parts by mass of the total amount of the Ce-stabilized zirconia powder, Y-stabilized zirconia powder and alumina powder.

8. A method of producing alumina/zirconia ceramics according to claim 6, wherein after the firing step, a hot isostatic pressure firing is further conducted at not higher than 1500° C.

* * * * *